Figure 1:
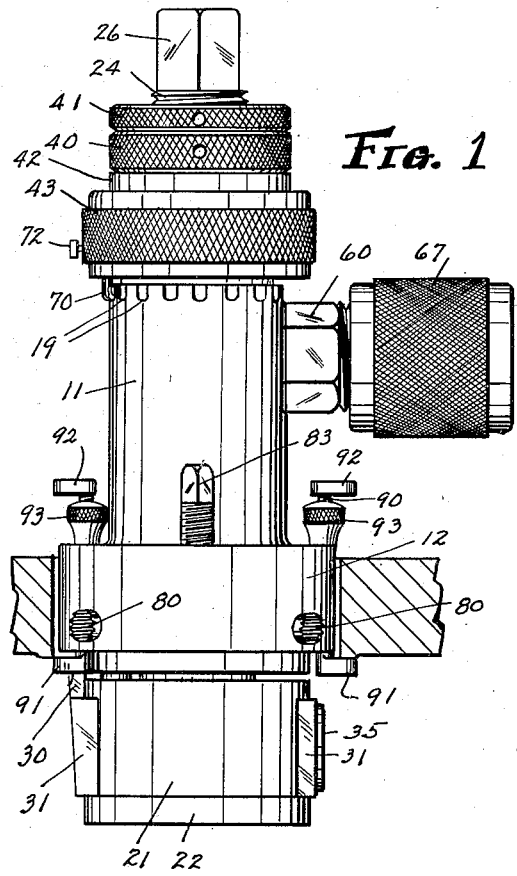

June 7, 1949. J. E. GILES 2,472,374
RESURFACING TOOL
Filed March 7, 1945 2 Sheets-Sheet 1

INVENTOR.
JOHN E GILES
BY
Bates, Teare, v McBean
ATTORNEYS

June 7, 1949.          J. E. GILES          2,472,374
RESURFACING TOOL
Filed March 7, 1945                    2 Sheets-Sheet 2
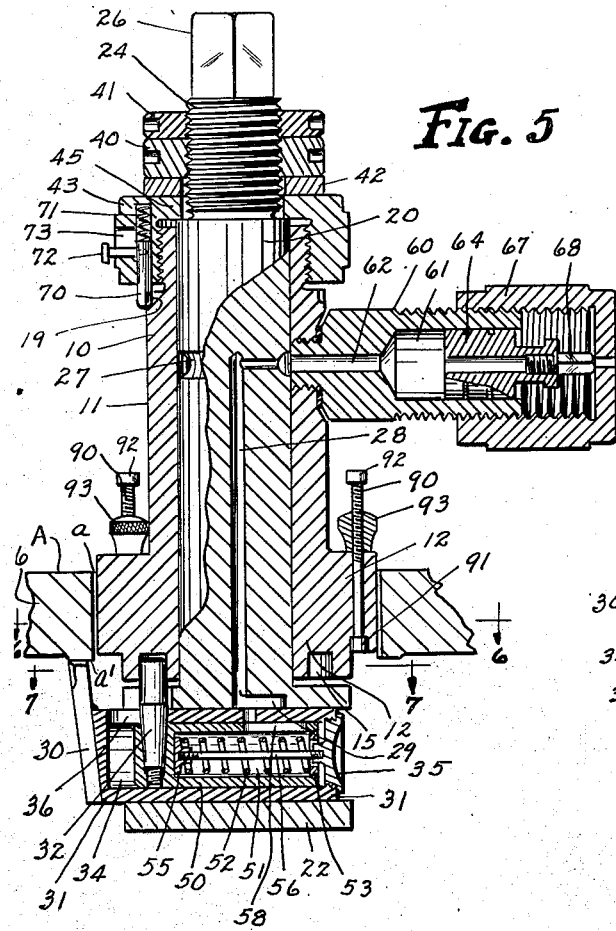
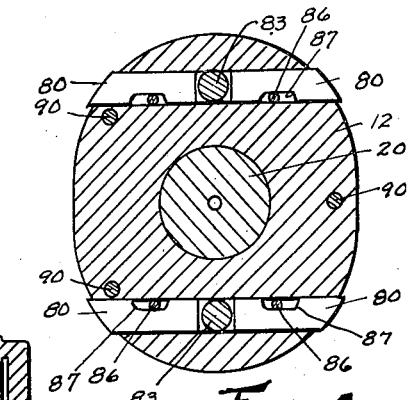
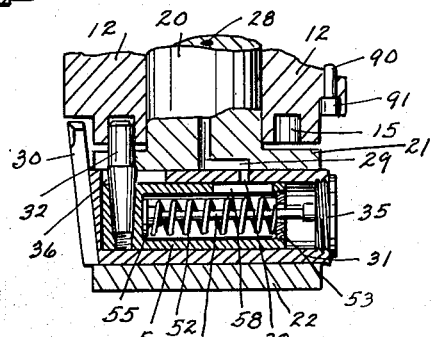
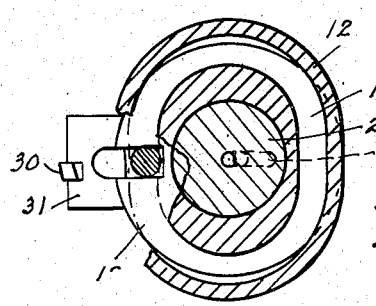
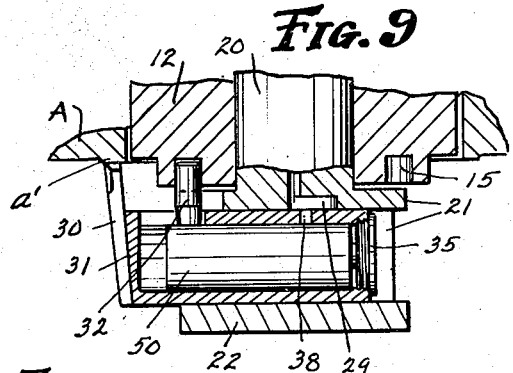
INVENTOR.
JOHN E GILES
BY
Bates, Teare, & McBean
ATTORNEYS Patented June 7, 1949

2,472,374

UNITED STATES PATENT OFFICE 2,472,374

RESURFACING TOOL

John E. Giles, Diablo Heights, C. Z.

Application March 7, 1945, Serial No. 581,381

6 Claims. (Cl. 82—4)

This invention relates to a tool for trimming or re-facing the seat at the margin of a non-circular opening. Illustration of such openings are the elliptical hand holes in boilers, stills, economizer headers and other containers. Such elliptical openings are closed in use by a correspondingly shaped closure member passed from the exterior to the inside of the vessel and caused by external means to seat on the inner margin of the opening or on an interposed gasket bearing against such margin. Hence it is important that this inner margin about the opening be smooth, to make a proper seat for the gasket or closure.

In use such marginal seats are liable to become worn or pitted so that leakage results. In the past when this condition arose the entire device or section has been replaced, at a considerable expense and loss of time, or the seat has been repaired by welding material over the eroded portions and grinding off the excess of the weld by hand, or by applying filling compounds to the grooves and depressions. Neither of these methods of repair has been satisfactory, or resulted in a smooth seat. On the other hand, it has been very difficult, with any existing tools, to machine the seat on account of its peculiar shape and inaccessibility.

It is the general object of my invention to provide an efficient tool which may be mounted in the opening and operated from the exterior to machine accurately the seat on the inside.

Another object is to provide such a tool carrying a trimming bit so controlled that it may move in a path corresponding to the contour of the opening and act against the margin to produce a perfectly smooth seat.

My invention includes means for properly positioning the tool in the opening, and for clamping it in place, and means for then causing the cutting bit on the interior to travel in a course corresponding to the shape of the opening while being suitably pressed against the surface to effect the desired smoothing cut. It is a further object of the invention to provide a tool having such characteristics in a simple, efficient and readily operable device.

My invention is hereinafter more fully described in connection with a preferred embodiment thereof illustrated in the drawings, the particular features thus illustrated being also included within my invention as defined in the appended claims.

Figure 3:
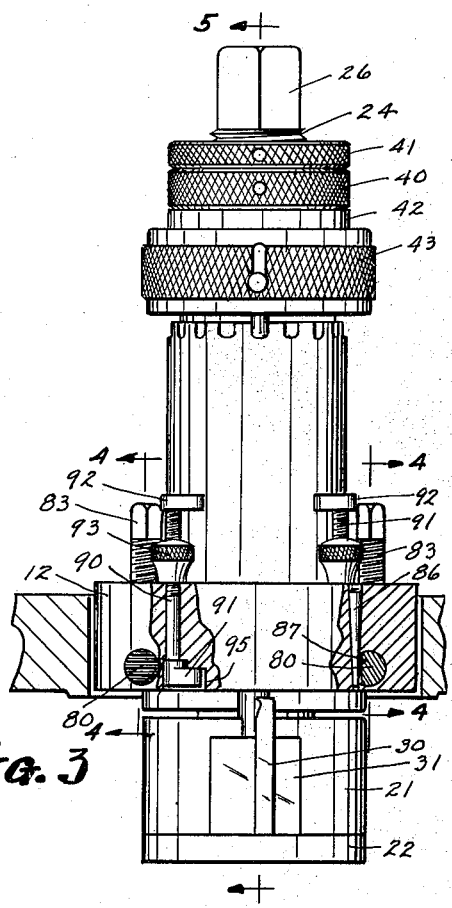
Figure 2:
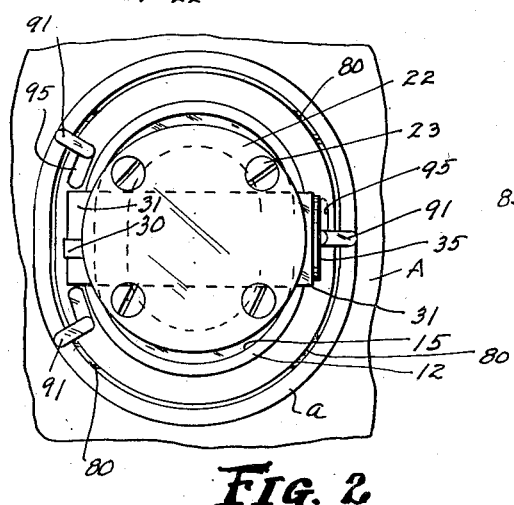
Figure 4:
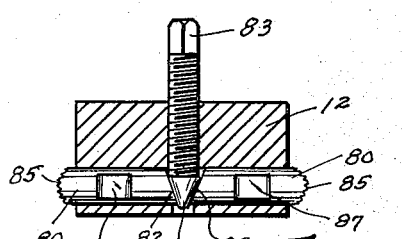

In the drawings, Fig. 1 is a side elevation of my resurfacing tool looking toward the minor axis of the elliptical head of the tool body as preliminarily positioned in an elliptical handhole opening through a wall of a boiler or header; Fig. 2 is a bottom plan of the tool, as shown in Fig. 1; Fig. 3 is an elevation of the tool at right angles to Fig. 1 and showing it in position ready for use, the view being taken looking toward the major axis of the body head, and some of the parts being shown in section; Fig. 4 is a detail of one of the clamping devices, the plane being indicated by either of the lines 4—4 on Fig. 3, in either case the view being taken looking outwardly; Fig. 5 is an axial section through the tool showing the bit carrier in its extended position; Fig. 6 is a cross section through the body of the tool and the rotating spindle in a plane normal to the axis as indicated by the line 6—6 on Fig. 5; Fig. 7 is a horizontal cross section through the controlling cam groove of the tool, as indicated by the line 7—7 on Fig. 5 looking downwardly; Fig. 8 is a sectional view of the lower portion of the device corresponding to Fig. 5 but showing the bit carrier retracted; Fig. 9 is a sectional side elevation of the lower portion of the device, showing the bit carrier extended and rotated 90° from the position shown in Fig. 5.

In the embodiment of the tool shown in the drawings, the body or frame 10 comprises a hollow cylindrical portion 11 terminating in a head 12 having an elliptical contour. This head is slightly smaller than the opening through the material to be trimmed and carries means, hereinafter described in detail, for properly positioning the head in the opening and clamping it therein. Briefly it may be said that the positioning is effected by means on the head temporarily engaging the seat, and the clamping by expandable means in the head which engage the wall of the opening.

A cylindrical bore extends through the tubular portion and head. In this bore is journaled a spindle 20, the lower end of which has an enlarged head 21. A suitable cutting or trimming bit 30 is carried by the head 21 and means hereinafter described causes the bit to take an orbital course corresponding to the shape of the seat to be trimmed.

As shown, the cutting or trimming bit 30 is rigidly mounted in a bit carrier 31 (hereinafter described in detail) which occupies a diametric passageway in the head 21. This bit carrier is shown as having a rectangular exterior contour and as mounted in a correspondingly shaped notch in the head 21, being retained therein by a bottom plate 22 secured to the head by screws 23.

The spindle with the carrier is retained in place in the frame 10 by suitable nuts 40, 41 mounted on a threaded extension 24 of the spindle. As shown, the nut 40 bears against a washer 42 surrounding the spindle and this washer bears against a cap 43 threaded on the upper end of the body 10. The nut 41 acts as a jam nut for the nut 40.

The spindle is rotatable with the nuts 40, 41 but prevented from axial shifting, the downward thrust being taken by the nut 40 against the cap 43 through the interposed washer 42, and the upward thrust being taken by the annular portion 45 of the cap which overhangs an annular shoulder on the spindle adjacent the beginning of the threaded portion. At its extreme upper end the spindle is formed angularly as shown at 26, for the application of a suitable crank for rotating the spindle.

It will be seen that if the tool so far described is clamped in proper position in an opening in a member to be trimmed and the spindle rotated, the bit 30 may engage and re-face a marginal surface on the interior provided that the bit is caused to travel to and from the axis of rotation, as such surface varies from being circular.

In Figs. 1, 2, 3 and 5, I have indicated at A a suitable plate or other member having a handhole opening a which may be occupied by my tool and having on the inner side of such member about the opening a marginal portion a' forming a seat which the tool is to trim. If the opening a is elliptical, I cause the tool 30 to move outwardly as it travels toward the end of the major axis of the ellipse and then to move inwardly as it travels toward the end of the minor axis. This is one of the features of my invention.

To give the in and out travel automatically to the cutting bit consequent upon the rotation of the spindle, I provide a controlling cam, having a shape corresponding to the shape of the opening a or the seat a', and a coacting pin, one of which coacting members is mounted on the spindle and the other on the stationary frame of the tool. In the embodiment shown the cam comprises an elliptical groove 15 formed in the undersurface of the head 12 and the coacting member comprises a pin 32 mounted in the bit carrier. The result is that as the spindle is rotated the bit travels in an elliptical course corresponding to the a' to be trimmed.

I provide manual means for shifting the bit-carrier in or out independent of the cam control described, so that the bit may be fed laterally to cause it to travel gradually across the seat during the trimming operation. This same means may, if desired, cause the bit to make a circuit somewhat different from the fixed ellipse provided by the groove 15. The mechanism for effecting this independent shifting of the bit will now be described.

The bit-carrier 31 is formed with a cylindrical bore 34, closed at the outer end by a removable plug 35 threaded into the bore. Within the bore is a cup-shaped piston 50 snugly but slidably mounted in the bore. This piston has a bore 51 in which is mounted a helical compression spring 52. This spring bears at the outer end against an annular head 53 screw-threaded into the piston and at the other end against a circular plate 55 threaded on a rod 56, the other end of which is threaded into the bit-carrier head 35. The piston 50 carries the pin 32 heretofore referred to, which extends through a slot 36 in the bit carrier into the cam groove 15. The piston 50 has a slotted passageway 58 through its wall which is always in registration with a passageway 38 through the wall of the bit-carrier.

It will be seen from the description given that if fluid under pressure is admitted to the passageway 38 it will pass through the slot 58 into the piston 50 and thence through the central opening in the annular head 53 and act against the carrier head 35. As the position of the piston is determined by the engagement of the pin 32 with the wall of the groove 15, it follows that the fluid pressure will force the bit carrier toward the right in Fig. 5, for instance, so that it may reach an opposite extreme position shown in Fig. 8, with the bit entirely retracted, or it may take an intermediate position dependent upon the relation of the fluid pressure to the pressure caused by the compression spring 52. In other words, the bit is positioned relative to the pin 32 by a balance of the spring pressure and the fluid pressure and if the fluid pressure increases the bit moves in one direction and if it decreases it moves in the opposite direction.

To effect increase or decrease of the internal fluid pressure, I provide the control device shown in Figs. 1 and 5. As there shown, I have mounted on the frame barrel 11 a lateral barrel 60 which has an internal bore 61 communicating by a passageway 62 with an annular passageway 27 formed as a groove about the spindle 20. This annular passageway 27 communicates with an axial passageway 28 in the spindle which leads to a lower enlargement 29 formed to register at all times with the opening 38 in the bit carrier.

Mounted in the bore 61 of the barrel 60 is a plunger 64. Oil or other non-compressible liquid fills the bore in front of this piston, fills the passageways 62, 27, 28, 29 in the spindle and the passageways to the interior of the piston 50 and from such interior to the space between the right hand end (Fig. 5) of the piston and the head 35 of the bit carrier. The result is that if the piston 64 is shoved inwardly the liquid at once transmits motion therefrom to the head 35, moving the bit carrier toward the right. On the other hand, if the piston 64 is moved outwardly, the former pressure of the oil against the head is relieved and the spring 52 draws the bit carrier toward the left.

To effect the desired movement of the piston 64 under manual control, I provide a cap 67 threaded on the exterior of the barrel 60 and having the inner surface of its head acting against the plunger 64. As shown, the head of the cap bears against a plug 68 which is screwed into a bore in the plunger 64. The removal of the cap 67 and the plug 68 allows the original installation of oil in the passageways, this being accomplished by placing tool in horizontal position and removing bit carrier head 35 to allow air to escape from passageways. Then oil poured into the barrel 60 fills the bit carrier and the head 35 is replaced and the piston 64 is replaced, and the plug 68 is installed. The plug 68 is also useful in that it facilitates re-filling. In use, however, the plug 68 is tight in the piston 64 and acts as a unit therewith. The exterior of the cap 67 is preferably knurled as shown in Fig. 1, so that it may be readily grasped and turned as desired.

In the construction described, if the operator wishes to position the bit nearer the edge of the opening a, the margin of which is being trimmed, he merely grasps the knurled cap 67 and screws it on slightly, thus causing the entrained liquid to shove against the bit-carrier head 35 and move the bit inwardly. If he wishes the bit to be moved outwardly he turns the cap in the unscrewing direction, releasing the pressure of the liquid against the head 35 and allowing the spring to move the bit outwardly. In each case the lateral movement of the bit is directly proportional to the amount of axial movement of the control cap 67.

To shift the bit axially of the tool, to make a deeper or lighter cut, it is only necessary to turn the cap nut 43 slightly, thus carrying the annular shoulder which bears against the shoulder on the spindle outwardly or inwardly, that is upwardly or downwardly in Fig. 5. The clearance between the lower end of the frame head 12 and the head 21 on the spindle, and the clearance between the upper end of the pin 32 and the top wall of the groove 15, allows such upward adjustment.

To enable the axial adjustment to be made by very fine increments, I provide a comparatively fine screw thread where the cap 43 is mounted on the body 10. Further, I provide an annular series of notches 19 in the top portion of the body wall, any one of which may be occupied by a slidable bolt 70 mounted in the cap 43. This bolt is pressed downwardly (Fig. 5) by a spring 71 but whenever desired may be withdrawn by pressure of the operator's finger upwardly against lateral extension 72 of the bolt which occupies a slot 73 in the cap nut wall.

The provision just described makes a very simple and convenient means for adjusting the cut of the bit with great accuracy and for holding it for any set depth of the cut. The in and out movement of the cap nut 43 does not vary the position of the nuts 40 and 41 on the spindle, which remain locked after their original setting.

In the foregoing description of the operation, I have assumed that the elliptical head on the tool frame is stationarily mounted within the opening in the plate to be trimmed and in proper axial position therein. As previously mentioned my invention includes means for clamping the frame head tightly within the opening and also means acting as a preliminary to the clamping for insuring the proper axial position. These features will now be described.

In the head 12 are a pair of openings extending through the head parallel with the minor axis. In each of these openings is mounted a pair of plungers 80 having oppositely beveled inner faces 82. Mounted in the head are clamping screws 83 each of which has a conical end 84 extending between and bearing against the two aligned plungers 80. The turning in of this screw therefore spreads the plungers. The plungers have roughened exteriors indicated at 85 and thus when they are spread the head becomes definitely locked within the opening of the plate to be trimmed.

To prevent the plungers 81 inadvertently dropping out of the head when the tool is out of use, I provide pins 86 mounted in the head and engaging notches 87 in the side of the plungers. These pins are preferably tapered as shown in Fig. 3, and the adjacent wall of the plunger is correspondingly tapered, so that the pins not only act to retain the plungers in the head but prevent the plungers from turning though they may be readily forced out by the conical end of the set screw 83 or pushed inward manually if the set screw is backed off and relieves them.

Preliminary to the clamping of the head in the work, I wish to position the tool accurately with the spindle axis normal to the plane of the face of the seat so that the bit will maintain proper presentation thereto. The means for effecting this preliminary positioning is as follows:

Mounted in the head 12 parallel with the axis thereof are three rods 90 each having a laterally extending foot 91 at its lower end and a correspondingly extending head 92 at its upper end. The rods 90 are threaded, and mounted on such threads are thumb nuts 93. Normally these thumb nuts hold the rods drawn to the limit in the direction away from the bit with the feet 91 seated in the recesses 95 on the underface of the head 12. In this position each foot is entirely within the outer contour of the head and idle.

To locate the head axially it is placed in the opening in the member to be trimmed, the nuts 93 are loosened, the rods 90 are shoved through the head to carry the feet 91 out of the recesses 95 and then the rods are turned so that the feet extend across the seat to be trimmed, as shown in Figs. 1 and 2. The nuts are then tightened. Now, with the tool held manually with all three of the feet snugly engaging the seat to be trimmed, the axis of the tool must be normal to the plane of the seat. Accordingly it is only necessary to turn in the set screws 83 to clamp the head in the proper place. Then the feet are turned back away from the seat and the nuts tightened to pull the feet into the recesses 95 and there retain them.

It will be seen from the description given that my device is adapted for accurate mounting within an elliptical or other non-circular opening, the margin of which is to be trimmed; that after being mounted the bit may be given just the desired course of travel to effect the trimming and during such travel may be caused to shift in or out as desired to trim off the entire seat. Furthermore the adjustment provided for the spindle enables the very accurate determination of the depth of the cut. I am thus enabled by this tool to re-face handhole seats in a very much shorter time and much more accurately than has been accomplished by the methods heretofore in use. Moreover, the tool marks caused by the bit of this tool run lengthwise of the seat, thus making an ideal surface for the gasket to seat against, in fact a better surface than the original milled seat.

I claim:

1. A tool for trimming annular non-circular seats surrounding openings in members comprising a tubular body adapted to occupy the opening, means movably carried by the body and adapted to be extended to engage the seat to position the body axially in the opening, means carried by the body adapted to engage the wall of the opening to clamp the body in its positioned location, a spindle in the body, a bit-carrier transversely movable in the spindle, a bit carried by the carrier and adapted to coact with the seat, means for moving the bit-carrier in and out as the spindle rotates.

2. A tool for trimming annular non-circular seats surrounding openings in members comprising a tubular body adapted to occupy the opening, extendable and withdrawable means carried by the body and adapted to be positioned to engage the seat to locate the body axially in the opening, means carried by the body adapted to be moved to engage the wall of the opening to clamp the body in its positioned location, a spindle in the body, a bit-carrier transversely movable in the spindle, a bit carried by the carrier and adapted to coact with the seat, means for automatically moving the bit carrier in and out as the spindle rotates, manual means for adjusting the bit-carrier in and out independent of the automatic means, and means for adjusting the spindle axially with reference to the frame.

3. The combination of a frame, a rotary spindle mounted in the frame, a bit-carrier mounted in the spindle and movable in a direction transverse thereof, a bit carried by the bit-carrier adapted to coact with a seat about an opening, a piston within the bit-carrier, a pin carried by the piston coacting with a cam on said frame, fluid pressure means acting on said piston and bit-carrier to shift the bit-carrier laterally relative to the spindle, and movable means carried by the frame for varying the fluid pressure acting on the piston.

4. A tool adapted to trim a seat surrounding an opening in a member, comprising a tubular body adapted to be mounted within the opening, a rotary spindle within the body, a head on the spindle, a bit-carrier comprising a hydraulic cylinder transversely movable in the head, a bit carried by the bit-carrier adapted to coact with the seat surrounding the opening, a cam on the frame, a piston within the bit-carrier cylinder, a pin carried by said piston adapted to coact with the cam, a spring reacting between the piston and bit-carrier and means for admitting fluid under pressure to the bit-carrier cylinder to act on the bit-carrier in opposition to the spring.

5. A tool comprising in combination a hollow body, a rotary spindle journaled within the body, a transverse guideway carried by the spindle beyond the body, a bit-carrier in such guideway, a bit on the carrier adapted to coact with a seat about the opening, said bit carrier being formed with a cylindrical bore, a piston within the bore, a pin carried by the piston into engagement with a cam carried by the body, a tubular passageway in the spindle communicating with said piston, and a device on the frame for varying fluid pressure in the passageway.

6. A tool comprising in combination a hollow body, means for clamping the same in an opening, a rotary spindle journaled within the body, a transverse guideway carried by the spindle beyond the body, a bit-carrier in such guideway, an outwardly facing bit on the carrier adapted to coact with a seat about the opening, said bit carrier being formed with a cylindrical bore, a piston within the bore, a pin carried by the piston extending movably through the wall of the bit-carrier into engagement with a cam carried by the body, the tubular passageway in the spindle communicating with said piston, a device carried by the frame having a passageway in communication with the passageway in the spindle and adapted to contain fluid communicating through the spindle passageway with the piston in the bit-carrier, a plunger in said device adapted to act on said fluid and a rotatable screw for moving the plunger.

JOHN E. GILES.

REFERENCES CITED

The following references are of record in the file of this patent:

UNITED STATES PATENTS

| Number | Name | Date |
|---|---|---|
| 485,233 | Smith | Nov. 1, 1892 |
| 638,712 | Higgins | Dec. 12, 1899 |
| 1,795,323 | Wade | Mar. 10, 1931 |
| 2,074,424 | Petersen | Mar. 23, 1937 |
| 2,230,509 | Lenarth | Feb. 4, 1941 |
| 2,283,323 | Erhardt | May 19, 1942 |

FOREIGN PATENTS

| Number | Country | Date |
|---|---|---|
| 10,241 | Great Britain | 1913 |
| 198,621 | Great Britain | June 7, 1923 |
| 247,679 | Great Britain | Feb. 25, 1926 |
| 60,592 | Norway | Nov. 30, 1936 |